US008713642B2

(12) United States Patent
Estrada et al.

(10) Patent No.: US 8,713,642 B2
(45) Date of Patent: Apr. 29, 2014

(54) COLLABORATIVE COMPUTING COMMUNITY ROLE MAPPING SYSTEM AND METHOD

(75) Inventors: Miguel A. Estrada, Hollis, NH (US); Joseph A. Russo, Westford, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2203 days.

(21) Appl. No.: 10/736,314

(22) Filed: Dec. 15, 2003

(65) Prior Publication Data

US 2005/0132224 A1 Jun. 16, 2005

(51) Int. Cl.
*H04L 29/00* (2006.01)
(52) U.S. Cl.
USPC .............. 726/4; 726/3; 726/26; 726/27
(58) Field of Classification Search
None
See application file for complete search history.

(56) References Cited

U.S. PATENT DOCUMENTS

| | | | | |
|---|---|---|---|---|
| 6,088,679 | A * | 7/2000 | Barkley | 705/8 |
| 6,202,066 | B1 * | 3/2001 | Barkley et al. | 707/9 |
| 6,460,141 | B1 * | 10/2002 | Olden | 726/4 |
| 7,305,392 | B1 * | 12/2007 | Abrams et al. | 707/9 |
| 7,328,233 | B2 * | 2/2008 | Salim et al. | 709/202 |
| 2002/0199123 | A1 * | 12/2002 | McIntyre et al. | 713/202 |
| 2004/0225893 | A1 * | 11/2004 | Ng | 713/200 |
| 2005/0144250 | A1 * | 6/2005 | Banatwala et al. | 709/215 |

OTHER PUBLICATIONS

Ferraiolo et al, "Proposed NIST Standard for Role-Based Access Control", ACM, Aug. 2001, Retrieved from the Internet on May 30, 2007: URL: http://csrc.nist.gov/rbac/rbacSTD-ACM.pdf>.*
Holvoet et al, "Application-Specific Reuse in Multi-Agent System Development", May 2002, Retrieved from the Internet on May 30, 2007: URL: http://www.cs.kuleuven.ac.be/cwis/research/distrinet/resources/publications/39554.pdf>.*
Kendall, "Role models—patterns of agent system analysis and design", Oct. 1999, Retrieved from the Internet on May 30, 2007: URL: http://www.springerlink.com/content/n6j4161701880655/fulltext.pdf>.*
Lupu et al, "A Policy Based Role Object Model", IEEE, 1997, Retrieved from the Internet on May 30, 2007: URL: http://www.doc.ic.ac.uk/~mss/emil/edoc97.pdf>.*
Ahn et al., "Role-Based Authorization Constrains Specification", Nov. 2000, Retrieved from the Internet on Jul. 15, 2008: <URL: http://citeseer.ist.psu.edu/ahn00rolebased.html>.*
Goh et al., "Towards a more Complete Model of Role", 1998, Retrieved from the Internet on Jul. 15, 2008: <URL: http://citeseer.ist.psu.edu/goh98towards.html>.*
Lupu et al., "A Policy Based Role Framework for Access Control", ACM, 1996, Retrieved from the Internet on Jul. 15, 2008: <URL: http://portal.acm.org/citation.cfm?id=270171&coll=portal&dl=ACM>.*
Lupu et al., "Reconciling Role Based Management and Role Based Access Control", Nov. 1997, Retrieved from the Internet on Jul. 15, 2008: <URL: http://citeseerist.psu.edu/lupu97reconciling.html>.*

* cited by examiner

*Primary Examiner* — Minh Dinh
(74) *Attorney, Agent, or Firm* — Steven M. Greenberg, Esq.; CRGO Law

(57) ABSTRACT

A role mapping method and system for a collaborative computing environment in provided. A set of permissions defining access to a generic business component for a named permission set is stored in a database. The set of permissions for the named permission set are mapped to an abstract role. Based on these mappings, access permissions to a business component instance within a community can be set.

7 Claims, 3 Drawing Sheets

FIG. 3

COMMUNITY ROLE MAP (20)

| 22 | 24 | 26 |
|---|---|---|
| DFi (28) | ABSTRACT ROLE 1 | MODERATOR |
| DLi (30) | ABSTRACT ROLE 1 | MANAGER |
| DFi | ABSTRACT ROLE 2 | CONTRIBUTOR |
| DLi | ABSTRACT ROLE 2 | MEMBER |
| DFi | ABSTRACT ROLE N | READER |
| DLi | ABSTRACT ROLE N | MEMBER |

FIG. 4

COMMUNITY ROLE (32, 34)

- GUID (PRIMARY KEY)
- COMMUNITY GUID
- NAME
- COMMUNITY ROLE
- USER FOR CREATOR

→

COMMUNITY ROLE MAP (36)

- GUID (PRIMARY KEY)
- COMMUNITY ROLE GUID
- OBJECT TYPE
- OBJECT GUID
- OBJECT ROLE ID

COLLABORATIVE COMPUTING COMMUNITY ROLE MAPPING SYSTEM AND METHOD

BACKGROUND OF THE INVENTION

1. Statement of the Technical Field

The present invention relates to collaborative computing environments and, in particular, to mapping attributes defining abstract roles within a collaborative computing community to independently defined roles.

2. Description of the Related Art

Collaborative computing provides a means for users to pool their strengths and experiences to achieve a common goal. For example, a common goal may be an educational objective, the completion of a software development project or even creation and use of a system to manage human resources. The establishment of a collaborative computing environment typically involves the creation or definition of a community. The community provides the framework under which the collaborative computing objective is achieved.

A collaborative computing community is defined by (1) a particular context, i.e. the objective of the community, (2) membership, i.e., the participants in the community, and (3) a set of roles for the community members. Roles are names given to the people in the community which dictate access to the community's resources and tools as well as define the behavior of the community members. Community creators or administrators may desire that the abstract roles have specific access and policy attributes for the different business components, i.e. tools, resources, etc. within the community. The access and policy attributes for the abstract roles in one community may be identical to the access and policy attributes for the abstract, but different roles in another community.

Current collaborative computing environments require that the attributes for each abstract role be defined within each specific community. For example, abstract roles in a community relating to an on-line education system may include Teacher and Student. The Teacher role may be configured to act as a manager to create, delete and modify access to a particular instance of a business component, e.g. discussion list. Another community in the system relating to software development may have an abstract role named Developer configured to act as a manager to create, delete and modify access to a particular instance of a business component. Although the roles of Teacher and Developer have the same access policy to instances in their respective environments, current collaborative computing systems require individual configuration for each role. It is desirable to have a method and system which allows for the creation of abstract permission policies with the ability to "glue" these policies to abstract roles in a way that is reusable.

SUMMARY OF THE INVENTION

The present invention addresses the deficiencies of the art in respect to quickly and efficiently setting user privileges within a collaborative computing environment and provides a novel and non-obvious method and system for community role mapping.

Methods consistent with the present invention provide a role mapping method for a collaborative computing environment in which a set of permissions defining access to a generic business component for an abstract permission set are stored and the set of permissions for the named permission set are mapped to an abstract role.

Systems consistent with the present invention include a system for handling role mapping in a collaborative computing environment in which the system has a computer having a database. The database stores a set of permissions defining access to a generic business component for a named permission set and a mapping of the set of permissions for the named permission set to an abstract role.

In accordance with still another aspect, the present invention provides a computer-readable storage medium storing a computer program which when executed performs a collaborative computing method. The computing method includes storing a set of permissions defining access to a generic business component for a named permission set and mapping the set of permissions for the named permission set to an abstract role.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is a table showing community role mapping between the abstract roles and the deployment environment-wide named permission sets;

FIG. 4 is an object relationship diagram showing the relationship between a community role object and a community role map object.

DETAILED DESCRIPTION OF THE PREFERRED EMBODIMENTS

Figure 1:
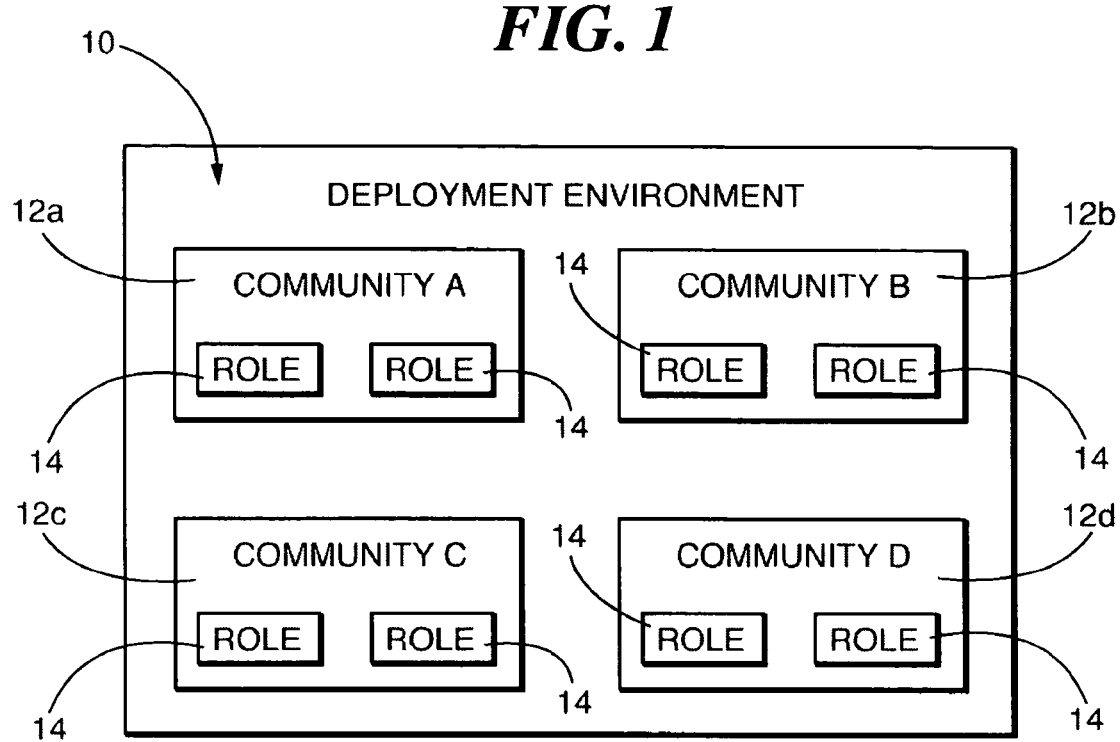
FIG. 1 is a block diagram of a hierarchy of a typical collaborative computing deployment environment constructed in accordance with the principles of the present invention.

The present invention is a method and system for mapping abstract roles and their associated attributes within particular collaborative computing environment communities to named permission sets broadly defined within the entirety of the collaborative computing environment. Referring now to the drawing figures in which like reference designators refer to like elements there is shown in FIG. 1 a block diagram of a hierarchy of a typical collaborative computing deployment environment constructed in accordance with the principles of the present invention and designated generally as 10. Each collaborative computing deployment environment 10 includes one or more communities such as community A 12*a*, community B 12*b*, community C 12*c* and community D 12*d* (referred to collectively herein as communities 12). Each community 12 includes one or more roles 14. Of note, although FIG. 1 shows a multitude of roles each labeled "14" it is understood that roles within communities can be the same or different depending on the content of the community and the intent of the community creators. This is, in turn, a function of the desired and expected behavior of the membership within each community.

For example, the context of community A 12a may be that of an educational collaborative computing environment and have roles defined as Teacher and Student while community B 12b may be a collaborative computing community whose context is that of a software development community and may include roles such as Development Manager, Architect and Software Developer.

While the software development and educational communities may have very different objectives and different business component instances e.g. specific discussion forums and document libraries and different types of expected behavior, certain roles may, at a high level, bear certain similar characteristics. For example, the Principal role in the educational community may be able to add or remove Teachers and Students from a community, create/delete discussion forums and document libraries within the community, etc. while the Development Manager may similarly be able to add and remove Software Developers and Architects from the community and create/delete document libraries and discussion forums from the community.

The present invention advantageously provides for such abstraction and facilitates collaborative computing environment deployment and management efficiencies by providing a generic set of permissions, called named permission sets, applicable to generic business components which can be mapped to abstract roles for business component instances within a community. This arrangement advantageously provides an environment in which the people responsible for deployment of collaborative computing environments and communities need not configure specific permissions for each abstract role. Rather, deployment administrators can map named permission sets to these abstract roles to provide users with permissions within each community without having to specifically configure each role within each community. In other words, specific access and policy attributes for the different business component instances within each community can be quickly configured by mapping the desired access and policy attributes to generic named permission sets applicable to generic business components.

Figure 2:
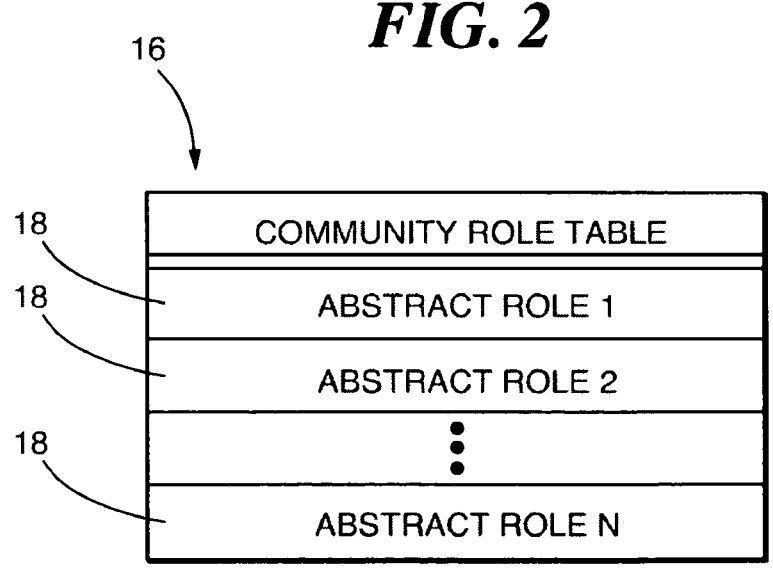
FIG. 2 is a table showing abstract community roles.

An exemplary embodiment of community role mapping is explained with reference to FIGS. 2 and 3 in which FIG. 2 is a table showing abstract community roles and FIG. 3 shows the community role mapping between the abstract roles and the deployment environment-wide named permission sets.

FIG. 2 shows community role table 16 having specific role rows 18. Each of abstract role rows 18 defines a particular role within a community 12. For example, in the case of the educational community described above, abstract roles may include those of Teacher, Student and Principal. Each abstract role within the community is included in an entry in community role table 16.

Community role map 20 shows the mapping between abstract roles 18 in community role table 16 and a named permission from within a pre-defined named permission set for a generic type of business component, e.g. a document library. Community role map 20 includes three columns. Business component instance column 22 has entries for specific business components within the community. As shown in FIG. 3, business component instance column 22 includes discussion forum instances (DFi) and document library instances (DLi). Discussion forums and document libraries are known in the art and are not explained herein. Of course, other types of business component instances can be used.

Abstract role column 24 includes entries for one or more abstract roles defined in community role table 16. Named permission set column 26 includes entries which map the abstract roles to the corresponding named permission set. For example, row 28 in community role map 20 shows that abstract role 1 within discussion forum DFi acts as the moderator named permission set. Similarly, row 30 in community role map 20 shows that abstract role 1 within document library instance DLi is mapped to the named permission set of manager. For example, the named permission sets within discussion forums are administrator, moderator, contributor and reader, and are defined as having certain access privileges within the discussion forum. An administrator may have global privileges within a discussion forum while the moderator may be able to add and delete contributors or readers and approve entries to the discussion forum. A contributor may be able to post to the discussion forum and read the discussion forum while a reader may only be able to have view access to the discussion forum.

Using the previous educational community example, row 28 in community role map 20 may provide that the abstract role 1 is a teacher whose role maps to that of the named permission set moderator. Similarly, for document libraries, the named permission sets may include manager, member and owner with particular access and/or creation privileges corresponding thereto. In this manner, named permission sets which generically define access and creation privileges can be "glued" to specific business instances and abstract roles within a community, thereby allowing efficient reuse of pre-defined privileges within deployment environment 10.

By way of non-limiting example, permissions for a discussion forum may include create forum, delete forum, create topic, delete topic, create response, delete response and view. It is the grouping of these permissions to abstract roles that creates the named permission sets.

Community roles and mappings and their implementation in an object oriented computing environment are further explained with reference to the object relationship diagram shown in FIG. 4. Object/relationship ("O/R") 32 shows the relationship between the community role object 34 and community role map object 36. Community role object 34 represents the valid roles set for a particular community. Community role object 34 includes a primary key guid (global unique identifier), community guid, name, community role and useforcreator elements within its schema. The primary key guid is the unique identifier for the row in the community role object 34. Community guid is the unique identifier for the context where the community role is being used. For example, the community guid for an educational community is a unique ID specific to a particular classroom community. Name is the role name string, e.g. teacher. Community role ID is an integer indicating the community role ID corresponding to the role name string. Useforcreator is a boolean element which, if set, indicates that the creator of the community instance is assigned this role.

The schema of community role map object 36 is arranged to hold the mappings of the roles specified within the community role objects 34 for each and every business component within the community. As such, there is a role for each and every business component. The schema includes a primary key guid, which is a unique identifier for the particular role in the table. Community role map object 36 also includes a community role guid which is a unique identifier for the corresponding community role in community role object 34. Object type within community role map 36 is a string indicating the object type. Object guid is a unique identifier for the object, for example, a particular business component guid and object role id is an integer with the role ID for this role mapping as it will be mapped into this object.

Figure 5:
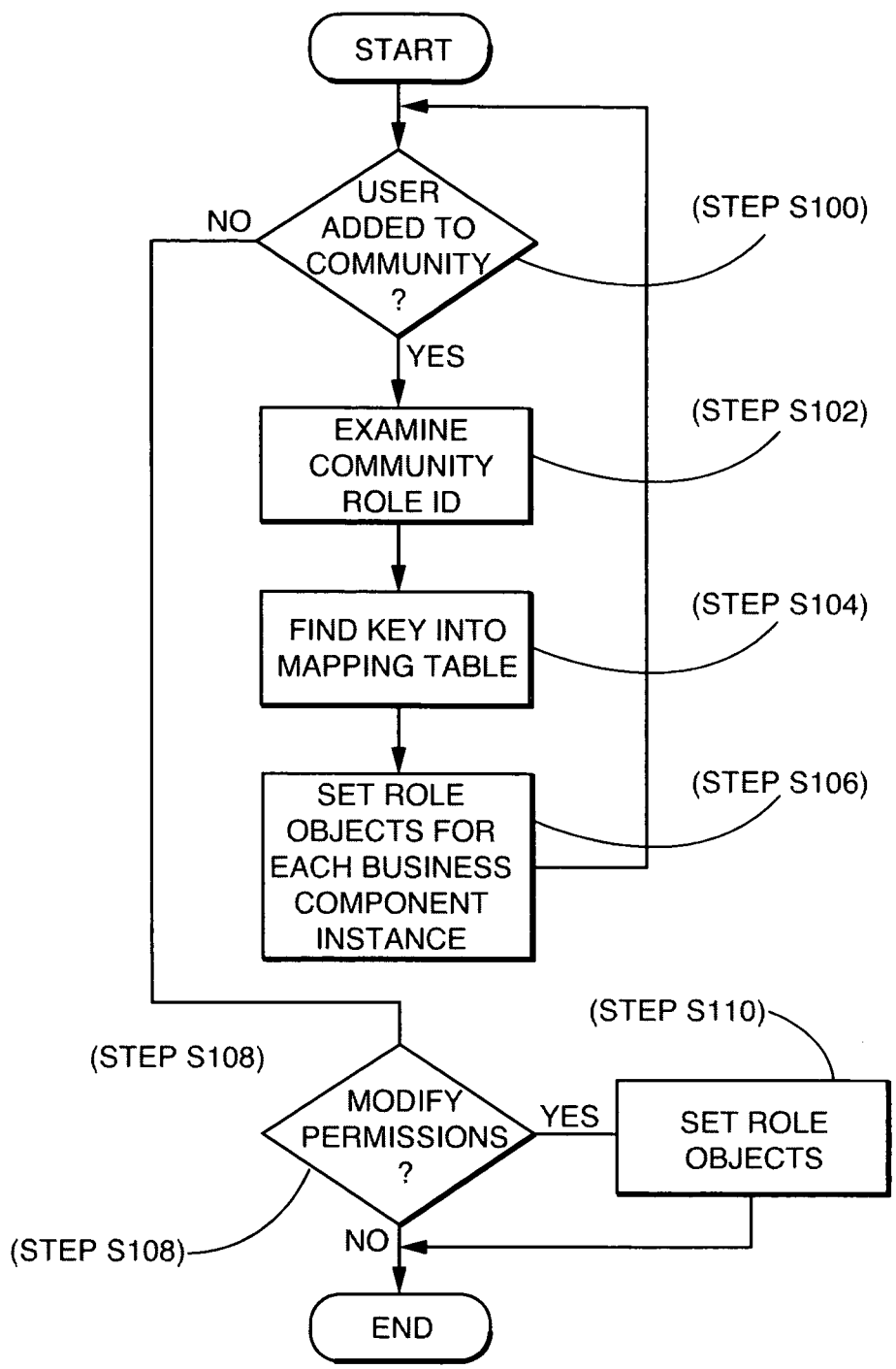
FIG. 5 is a flow chart of the process of setting or modifying permissions for a user within a community.

The process of setting or modifying permissions for a user within a community is explained with reference to the flow chart in FIG. 5. In the case were a user is added to a community (step S100), the computer supporting the community examines the community role ID integer (step S102) within community role object 34 to find the corresponding community guid for mapping into community role map object 36 (step S104). Role objects, such as object type, object guid and object role ID for each corresponding community role object are set for each business component instance within the community (Step S106). In other words; the permissions are set for business components as established by the named permission set corresponding to the business component type. This process continues for each user added to the community.

If no users are added to the community and/or permissions for specific users and/or roles are to be modified (step S108), the software running the collaborative community deployment environment 10 allows an administrator or other user having proper authority to modify the permissions. In this case, the software sets those roles objects requiring modification to their new parameters (step S100). In this way, permissions for particular users and/or specific roles which do not map exactly into the permission sets corresponding to the generic roles can be modified.

The present invention advantageously provides a system and method which facilitates collaborative computing environment deployment, configuration and modification by allowing abstract roles to be created and modeled based on pre-defined generic roles having pre-configured permissions and named permission sets. This arrangement goes beyond mere templating because it does not necessarily require that the permissions corresponding to abstract roles must be further modified or that a particular abstract role is customized based on a generic template. Rather, the present invention provides that permissions corresponding to abstract roles can be mapped based on named permission sets for generic roles and are hence directly configured.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods and functions described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A role mapping method for a collaborative computing environment, the method comprising:
    storing, by a computer processor, in a database of a computing system a generic set of permissions of a generic named permission set, the generic named permission set defining access to a generic business component; and
    mapping, by the computer processor, the named permission set to multiple different abstract roles for multiple different business component instances in multiple different collaborative computing communities having different objectives in the collaborative computing environment executing in the memory by the computer system, wherein the multiple different abstract roles in the multiple different collaborative computing communities have certain similar characteristics.

2. The method of claim 1, further comprising setting access permissions to a business component instance within a collaborative computing community based on the mapped set of permissions.

3. The method of claim 1, further comprising modifying one or more permissions within the mapped set of permissions for one of the abstract roles.

4. The method of claim 1, wherein the mapping is defined by a mapping between a community role map object and a community role object for each of the collaborative computing communities.

5. The method of claim 4, wherein the community role object identifies at least a unique collaborative computing community and the abstract role within the unique collaborative computing community, and wherein the community role map object identifies at least the unique collaborative computing community and the named permission set corresponding to the abstract role within the unique collaborative computing community.

6. The method of claim 4, wherein the community role map object further defines the business component corresponding to the named permission set.

7. The method of claim 6, wherein each permission within the permission set defines at least one of access and creation authority.

* * * * *